(12) United States Patent
Kouno et al.

(10) Patent No.: US 10,752,729 B2
(45) Date of Patent: Aug. 25, 2020

(54) COATING FILM HAVING CHEMICAL RESISTANCE

(71) Applicant: MITSUBISHI GAS CHEMICAL COMPANY, INC., Tokyo (JP)

(72) Inventors: Kazuki Kouno, Kanagawa (JP); Saeko Sato, Kanagawa (JP); Tomotaka Wada, Kanagawa (JP); Yuiga Asai, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 15/572,923

(22) PCT Filed: Jun. 1, 2016

(86) PCT No.: PCT/JP2016/066202
§ 371 (c)(1),
(2) Date: Nov. 9, 2017

(87) PCT Pub. No.: WO2016/208344
PCT Pub. Date: Dec. 29, 2016

(65) Prior Publication Data
US 2018/0118877 A1 May 3, 2018

(30) Foreign Application Priority Data

Jun. 26, 2015 (JP) ................................. 2015-128613

(51) Int. Cl.
*C08G 59/44* (2006.01)
*C09D 7/40* (2018.01)
*C09D 5/08* (2006.01)
*C09D 163/00* (2006.01)

(52) U.S. Cl.
CPC .............. *C08G 59/44* (2013.01); *C09D 5/08* (2013.01); *C09D 7/40* (2018.01); *C09D 163/00* (2013.01); *C08G 2150/90* (2013.01)

(58) Field of Classification Search
None
See application file for complete search history.

(56) References Cited

U.S. PATENT DOCUMENTS

| | | | |
|---|---|---|---|
| 2005/0158494 A1* | 7/2005 | Koyama | B32B 27/08 428/35.7 |
| 2010/0160494 A1 | 6/2010 | Yonehama et al. | |
| 2015/0082747 A1* | 3/2015 | Honda | B32B 27/38 53/396 |

FOREIGN PATENT DOCUMENTS

| | | | |
|---|---|---|---|
| CN | 1454950 A | 11/2013 | |
| EP | 1219656 A1 | 7/2002 | |
| EP | 1350822 A1 | 10/2003 | |
| JP | S59-140221 A | 8/1984 | |
| JP | H09-263713 A | 10/1997 | |
| JP | 2002080564 A | 3/2002 | |
| JP | 2004-026225 A | 1/2004 | |
| JP | 2004-277484 A | 10/2004 | |
| JP | 2006070125 A | 3/2006 | |
| WO | 2008/143247 A1 | 11/2008 | |
| WO | WO-2013161480 A1 * | 10/2013 | B32B 27/38 |

OTHER PUBLICATIONS

International Search Report from Application No. PCT/JP2016/066202, dated Jul. 12, 2016.
International Preliminary Report on Patentability from Application No. PCT/JP2016/066202, dated Dec. 26, 2017.
Extended European Search Report in European Application No. 16814115.8 dated Jan. 21, 2019.

* cited by examiner

*Primary Examiner* — Rachel Kahn
*Assistant Examiner* — Ha S Nguyen
(74) *Attorney, Agent, or Firm* — Greenblum & Bernstein, P.L.C.

(57) ABSTRACT

A coating film formed by curing of an epoxy resin composition containing at least an epoxy resin, an epoxy resin curing agent and a solvent, wherein the coating film contains the solvent in a ratio of 1% by mass or more and 20% by mass or less, and the epoxy resin curing agent is a reaction product of the following (A) and (B). (A) At least one selected from the group consisting of metaxylylenediamine and paraxylylenediamine. (B) At least one selected from the group consisting of an unsaturated carboxylic acid represented by the following formula (1) and a derivative thereof:

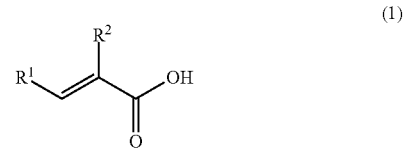

(1)

wherein $R^1$ and $R^2$ each independently represent a hydrogen atom, an alkyl group having 1 to 8 carbon atoms, an aralkyl group having 1 to 8 carbon atoms, or an aryl group.

17 Claims, No Drawings

COATING FILM HAVING CHEMICAL RESISTANCE

TECHNICAL FIELD

The present invention relates to a coating film having chemical resistance.

BACKGROUND ART

Heretofore, as an anticorrosion paint for ships, steel structures and the like, a tar epoxy paint has been used.

A non-tar paint using a petroleum resin in place of tar has also been developed (see PTL 1).

On the other hand, a paint prepared by adding an amine-type curing agent to an epoxy resin is excellent in anticorrosion performance and adhesiveness, and is therefore used as an anticorrosion paint. In particular, in applications requiring high-level anticorrosion performance and waterproofness, a Mannich-type curing agent formed through Mannich condensation of a phenol, an aldehyde and an amine compound, or a Mannich-type curing agent formed through Mannich condensation of an adduct of the Mannich-type curing agent and an epoxy resin, and a phenol, an aldehyde and an amine compound has been used (see PTL 2).

CITATION LIST

Patent Literature

PTL 1: JP-A 9-263713
PTL 2: JP-A 2002-80564

SUMMARY OF INVENTION

Technical Problem

The tar epoxy paint as an anticorrosion paint is excellent in anticorrosion performance, waterproofness and chemical resistance, but as containing tar, there is concern that the paint would have a problem of safety and health, and as other problems in addition, as black, maintenance of the paint is difficult and in a closed place the paint looks dark and working with it is risky.

On the other hand, the non-tar paint using a petroleum resin in place of tar is problematic in point of the compatibility of the curing resin containing an epoxy resin and an amine-type curing agent with the petroleum resin, and therefore, in particular, the paint is insufficient for application to use that requires high-level anticorrosion performance and waterproofness.

Further, regarding the Mannich-type curing agent, a phenol remains in the curing agent, and therefore there is concern that the curing agent is also problematic in point of safety and health.

An object of the present invention is to solve the above problems and to provide a coating film having good appearance and high chemical resistance.

Solution to Problem

The present inventors have assiduously studied for the purpose of solving the above problems and, as a result, have found that a coating film containing a solvent in a specific ratio in a cured product formed of a specific epoxy resin composition has good appearance and high chemical resistance, and have reached the present invention. Specifically, the present invention is as follows.

[1] A coating film formed by curing of an epoxy resin composition containing at least an epoxy resin, an epoxy resin curing agent and a solvent, wherein the coating film contains the solvent in a ratio of 1% by mass or more and 20% by mass or less, and the epoxy resin curing agent is a reaction product of the following (A) and (B):

(A) At least one selected from the group consisting of metaxylylenediamine and paraxylylenediamine, and (B) At least one selected from the group consisting of an unsaturated carboxylic acid represented by the following formula (1) and a derivative thereof

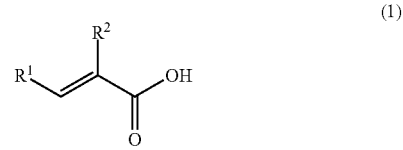

wherein $R^1$ and $R^2$ each independently represent a hydrogen atom, an alkyl group having 1 to 8 carbon atoms, an aralkyl group having 1 to 8 carbon atoms, or an aryl group.

[2] The coating film according to item 1, wherein the epoxy resin curing agent is a reaction product of the above (A) and (B), and further at least one compound selected from the group consisting of the following (C), (D) and (E):

(C) At least one selected from the group consisting of a monocarboxylic acid represented by $R^3$—COOH and a derivative thereof (where $R^3$ represents a hydrogen atom, or an alkyl group or an aryl group each having 1 to 7 carbon atoms and optionally having a hydroxy group), (D) A cyclic carbonate, and (E) A monoepoxy compound having 2 to 20 carbon atoms.

[3] The coating film according to item 1 or item 2, wherein the solvent is at least one selected from an alcohol compound and a hydrocarbon compound having an aromatic ring.

[4] The coating film according to any of item 1 to item 3, wherein the evaporation rate of the solvent is 0.10 or more and 4.5 or less when the evaporation rate of butyl acetate is taken as 1 being a standard value.

[5] The coating film according to item 3, wherein the alcohol compound is at least one selected from the group consisting of methanol, ethanol, 2-propanol, 1-propanol, 2-methyl-1-propanol, 1-butanol and 2-butanol.

[6] The coating film according to item 3, wherein the hydrocarbon compound having an aromatic ring is at least one selected from the group consisting of toluene, p-xylene, m-xylene, oxylene, styrene and ethylbenzene.

[7] The coating film according to any of item 1 to item 6, wherein the component (A) is metaxylylenediamine.

[8] The coating film according to any of item 1 to item 7, wherein the component (B) is at least one selected from the group consisting of acrylic acid, methacrylic acid, crotonic acid, and derivatives thereof.

[9] The coating film according to any of item 1 to item 8, wherein the derivative as the component (B) is at least one selected from the group consisting of an ester, an amide, an acid anhydride and an acid chloride.

[10] The coating film according to any of item 2 to item 9, wherein the component (C) is at least one selected from the group consisting of formic acid, acetic acid, propionic acid, butyric acid, lactic acid, glycolic acid, benzoic acid and derivatives thereof.

[11] The coating film according to any of item 2 to item 10, wherein the component (D) is at least one selected from the group consisting of ethylene carbonate, propylene carbonate and glycerin carbonate.

[12] The coating film according to any of item 2 to item 11, wherein the component (E) is a compound represented by the following formula (2):

(2)

wherein $R^4$ represents a hydrogen atom, an alkyl group having 1 to 8 carbon atoms, an aryl group, or $R^5$—O—$CH_2$—, and $R^5$ represents a phenyl group or a benzyl group.

[13] The coating film according to any of item 1 to item 12, wherein the epoxy resin is at least one selected from the group consisting of an epoxy resin having a glycidylamino group derived from metaxylylenediamine, an epoxy resin having a glycidylamino group derived from 1,3-bis(aminomethyl)cyclohexane, an epoxy resin having a glycidylamino group derived from diaminodiphenylmethane, an epoxy resin having a glycidylamino group derived from para-aminophenol, an epoxy resin having a glycidyloxy group derived from para-aminophenol, an epoxy resin having a glycidyloxy group derived from bisphenol A, an epoxy resin having a glycidyloxy group derived from bisphenol F, an epoxy resin having a glycidyloxy group derived from phenol-novolak, and an epoxy resin having a glycidyloxy group derived from resorcinol.

[14] The coating film according to item 13, wherein the epoxy resin is at least one selected from an epoxy resin having a glycidylamino group derived from metaxylylenediamine, an epoxy resin having a glycidyloxy group derived from bisphenol A, and an epoxy resin having a glycidyloxy group derived from bisphenol F.

[15] The coating film according to item 14, wherein the epoxy resin is an epoxy resin having a glycidyloxy group derived from bisphenol A.

[16] The coating film according to any of item 1 to item 15, wherein the epoxy resin composition is for a coating material for ships, a heavy-duty coating material, a coating material for tanks, a coating material for inner surfaces of pipes, an exterior coating material, or a coating material for floors.

[17] A method for producing a coating film of any of item 1 to item 16, wherein the curing temperature of the epoxy resin composition is from 0 to 50° C., and the curing time is from 0.5 to 48 hours.

[18] The method for producing a coating film according to item 17, further including a step of controlling the solvent amount after the curing.

[19] A method for improving chemical resistance of a coating film, wherein the coating film is formed by curing of an epoxy resin composition containing at least an epoxy resin, an epoxy resin curing agent and a solvent, the epoxy resin curing agent is a reaction product of the following (A) and (B), and the coating film contains the solvent in a ratio of 1% by mass or more and 20% by mass or less:

(A) At least one selected from the group consisting of metaxylylenediamine and paraxylylenediamine, and (B) At least one selected from the group consisting of an unsaturated carboxylic acid represented by the following formula (1) and a derivative thereof:

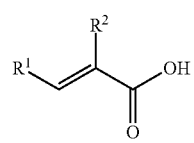

(1)

wherein $R^1$ and $R^2$ are the same as above.

Advantageous Effects of Invention

According to the present invention, a specific amount of a solvent is contained in a coating film formed by curing a specific epoxy resin composition to realize both good appearance and high chemical resistance. Consequently, the coating film of the present invention is favorably used as a coating material for ships, a heavy-duty coating material, a coating material for tanks, a coating material for inner surfaces of pipes, an exterior coating material, a coating material for floors, etc.

DESCRIPTION OF EMBODIMENTS

[Coating Film]

The present invention relates to a coating film containing a specific amount of a solvent in a cured product formed of a specific epoxy resin composition. Specifically, the present invention relates to a coating film formed by curing an epoxy resin composition containing at least an epoxy resin, an epoxy resin curing agent and a solvent, wherein the coating film contains the solvent in a ratio of 1% by mass or more and 20% by mass or less, and the epoxy resin curing agent is a reaction product of the following (A) and (B).

(A) At least one selected from the group consisting of metaxylylenediamine and paraxylylenediamine.

(B) At least one selected from the group consisting of an unsaturated carboxylic acid represented by the following formula (1) and a derivative thereof.

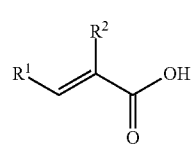

(1)

wherein $R^1$ and $R^2$ each independently represent a hydrogen atom, an alkyl group having 1 to 8 carbon atoms, an aralkyl group having 1 to 8 carbon atoms, or an aryl group.

The coating film of the present invention is formed by curing a specific epoxy resin composition and contains a specific amount of a solvent, therefore expressing good appearance and high chemical resistance. An epoxy resin composition is used in a broad field, and generally has a premise that a solvent does not remain in the cured product of the epoxy resin composition. Consequently, in the case where an epoxy resin composition contains a solvent, its curing is generally carried out under a heating condition, under which the solvent is removed from the cured product. In particular, an epoxy resin composition that is required to have a gas-barrier property is used as a wrapping or packaging material for foods, drinks and medicines, and therefore it is required that a solvent does not remain in the cured product thereof.

As opposed to this, the present inventors have found that, when a coating film formed by curing an epoxy resin composition contains a specific amount of a solvent, it can express good chemical resistance as compared with a case not containing a solvent.

A coating film of this embodiment is described below.

[Epoxy Resin]

The epoxy resin for use in this embodiment may be any of a saturated or unsaturated aliphatic compound, alicyclic compound, aromatic compound or heterocyclic compound having an epoxy group in the molecule, but in consideration of expression of high chemical resistance, an epoxy resin containing an aromatic ring or alicyclic structure in the molecule is preferred.

Specific examples of the epoxy resin for use in this embodiment include at least one resin selected from a group consisting of an epoxy resin having a glycidylamino group derived from metaxylylenediamine, an epoxy resin having a glycidylamino group derived from 1,3-bis(aminomethyl) cyclohexane, an epoxy resin having a glycidylamino group derived from diaminodiphenylmethane, an epoxy resin having a glycidylamino group derived from para-aminophenol, an epoxy resin having a glycidyloxy group derived from para-aminophenol, an epoxy resin having a glycidyloxy group derived from bisphenol A, an epoxy resin having a glycidyloxy group derived from bisphenol F, an epoxy resin having a glycidyloxy group derived from phenol-novolak, and an epoxy resin having a glycidyloxy group derived from resorcinol. For improving various properties of flexibility, impact resistance, wet heat resistance and others, the above-described epoxy resins may be mixed in a suitable ratio for use herein.

Among these, from the viewpoint of chemical resistance, the epoxy resin for use in this embodiment is more preferably one containing, as the main component, at least one selected from the group consisting of an epoxy resin having a glycidylamino group derived from metaxylylenediamine, an epoxy resin having a glycidyloxy group derived from bisphenol A and an epoxy resin having a glycidyloxy group derived from bisphenol F, and is even more preferably one containing, as the main component, an epoxy resin having a glycidyloxy group derived from bisphenol A.

In this embodiment, the "main component" means that it may contain any other component within a range not overstepping the scope and the spirit of the present invention, and the ratio thereof is preferably 50 to 100% by mass, more preferably 70 to 100% by mass, even more preferably 90 to 100% by mass.

The epoxy resin may be obtained by reaction of various alcohols, phenols and amines with an epihalohydrin. For example, the epoxy resin having a glycidylamino group derived from metaxylylenediamine is obtained by addition of epichlorohydrin to metaxylylenediamine. Metaxylylenediamine has four aminohydrogens, and therefore mono-, di-, tri and tetra-glycidyl compounds are formed. The number of the glycidyl groups may be changed by changing the reaction ratio between metaxylylenediamine and epichlorohydrin. For example, an epoxy resin having mainly four glycidyl groups can be obtained by addition reaction of metaxylylenediamine and about 4 molar times of epichlorohydrin.

The epoxy resin can be synthesized by reacting an excessive amount of an epihalohydrin with various alcohols, phenols and amines in the presence of an alkali such as sodium hydroxide, under a temperature condition of 20 to 140° C., preferably at 50 to 120° C. in the case of alcohols and phenols, and 20 to 70° C. in the case of amines, followed by separating the resultant alkali halide.

The number-average molecular weight of the epoxy resin for use in this embodiment varied depending on the molar ratio of the epihalohydrin to various alcohols, phenols and amines, and is preferably 100 to 5,000, more preferably 150 to 3,000, even more preferably 200 to 1,000.

[Epoxy Resin Curing Agent]

The epoxy resin curing agent for use in this embodiment is a reaction product of the following (A) and (B).

(A) At least one selected from the group consisting of metaxylylenediamine and paraxylylenediamine.

(B) At least one selected from the group consisting of an unsaturated carboxylic acid represented by the following formula (1) and a derivative thereof:

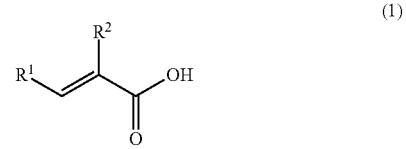

wherein $R^1$ and $R^2$ each independently represent a hydrogen atom, an alkyl group having 1 to 8 carbon atoms, an aralkyl group having 1 to 8 carbon atoms, or an aryl group.

Regarding the metaxylylenediamine and paraxylylenediamine of the component (A), metaxylylenediamine is preferred from the viewpoint of chemical resistance. One alone or two kinds may be mixed either singly or as combined for the component (A).

The component (B) includes at least one selected from the group consisting of an unsaturated carboxylic acid such as acrylic acid, methacrylic acid, 2l-ethylacrylic acid, 2-propylacrylic acid, α-isopropylacrylic acid, 2-n-butylacrylic acid, 2-t-butylacrylic acid, 2-pentylacrylic acid, α-phenylacrylic acid, α-benzylacrylic acid, crotonic acid, 2-pentenoic acid, 2-hexenoic acid, 4-methyl-2-pentenoic acid, 2-heptenoic acid, 4-methyl-2-hexenoic acid, 5-methyl-2-hexenoic acid, 4,4-dimethyl-2-pentenoic acid, 4-phenyl-2-butenoic acid, cinnamic acid, o-methylcinnamic acid, m-methylcinnamic acid, p-methylcinnamic acid, 2-octenoic acid, 2-nonenoic acid, 2-decenoic acid, 2-undecenoic acid, etc., and derivatives of an ester, an amide, an acid anhydride, and an acid chloride thereof.

Examples of the derivatives of acrylic acid and methacrylic acid include alkyl acrylates or methacrylates such as methyl (meth)acrylate, ethyl (meth)acrylate, n-propyl (meth)acrylate, isopropyl (meth)acrylate, n-butyl (meth) acrylate, isobutyl (meth) acrylate, n-octyl (meth) acrylate, 2-ethylhexyl (meth)acrylate, etc.; hydroxyalkyl acrylates or methacrylates such as 2-hydroxyethyl (meth)acrylate, 2-hydroxybutyl (meth)acrylate, etc.; phenyl (meth)acrylate, benzyl (meth)acrylate, (meth)acrylamide, di(meth)acrylic anhydride, (meth)acryl chloride, etc.

The component (B) is, from the viewpoint of chemical resistance, preferably at least one selected from the group consisting of acrylic acid, methacrylic acid, crotonic acid and a derivative thereof, more preferably at least one selected from the group consisting of acrylic acid, methacrylic acid and a derivative thereof, even more preferably at least one selected from the group consisting of acrylic acid, methacrylic acid and an ester with an alkyl having 1 to 3 carbon atoms thereof, still more preferably at least one selected from the group consisting of methyl acrylate and methyl methacrylate. One alone or two or more kinds may be used either singly or as combined for the component (B).

For carrying out the reaction of the component (A) and the component (B), when a carboxylic acid, an ester or an amide is used as the component (B), (A) and (B) are mixed under the condition of 0 to 100° C., preferably 0 to 70° C., and the resultant mixture is subjected to amide group forming reaction of dehydration, alcohol removal or amine removal under the condition of 100 to 300° C., preferably 130 to 250° C.

In this case, in the amide group forming reaction, the reaction apparatus may be depressurized in the final stage of the reaction as needed, for completing the reaction. Also as needed, the reaction system may be diluted using a nonreactive solvent. Further, as a dehydrating agent or an alcohol removing agent, a catalyst such as a phosphite or the like may be added.

On the other hand, in the case where an acid anhydride or an acid chloride is used as the component (B), the two components are mixed under the condition of 0 to 150° C., preferably 0 to 100° C., and the resultant mixture is subjected to amide group forming reaction. In this case, in the amide group forming reaction, the reaction apparatus may be depressurized in the final stage of the reaction as needed, for completing the reaction. Also as needed, the reaction system may be diluted using a nonreactive solvent. Further, a tertiary amine such as pyridine, picoline, lutidine, trialkylamine or the like may be added.

The amide group site introduced by the above-described reaction has a high cohesion force, and since such an amide group site exists in a high ratio in the epoxy resin curing agent, higher oxygen barrier performance and higher adhesion strength to various substrates can be realized.

Regarding the reaction ratio of the component (A) and the component (B), the reaction molar ratio [(B)/(A)] is preferably within a range of 0.3 to 1.0. When the reaction molar ratio [(B)/(A)] is 0.3 or more, a sufficient amount of an amide group is formed in the epoxy resin curing agent, and high-level chemical resistance and adhesiveness may tend to be expressed. On the other hand, when the reaction molar ratio [(B)/(A)] is 1.0 or less, the amount of the amino group necessary for the reaction with the epoxy group in the epoxy resin could be sufficient and excellent heat resistance and impact resistance can be expressed, and in addition, solubility in various organic solvents and water may tend to be better.

In special consideration of high chemical resistance and excellent coating film performance of the resultant epoxy resin cured product, the reaction molar ratio of the component (B) to the component (A) [(B)/(A)] is more preferably within a range of 0.5 to 1.0, even more preferably within a range of 0.6 to 1.0.

The epoxy resin curing agent in this embodiment may be a reaction product of the above-described (A) and (B), and at least one compound selected from the following (C), (D) and (E).

(C) At least one selected from the group consisting of a monocarboxylic acid represented by $R^3$—COOH and a derivative thereof (where $R^3$ represents a hydrogen atom, or an alkyl group or an aryl group each having 1 to 7 carbon atoms and optionally having a hydroxy group).

(D) A cyclic carbonate.

(E) A monoepoxy compound having 2 to 20 carbon atoms.

The monocarboxylic acid represented by $R^3$—COOH or a derivative thereof of the component (C) is used as needed from the viewpoint of lowering the reactivity between the epoxy resin curing agent and the epoxy resin for operability improvement. $R^3$ represents a hydrogen atom, or an alkyl group or an aryl group each having 1 to 7 carbon atoms and optionally having a hydroxy group, and $R^3$ is preferably an alkyl group having 1 to 3 carbon atoms or a phenyl group.

The component (C) includes a monocarboxylic acid such as formic acid, acetic acid, propionic acid, butyric acid, lactic acid, glycolic acid, benzoic acid or the like, or a derivative thereof, for example, an ester, an amide, an acid anhydride, an acid chloride, etc., and is preferably at least one selected from the group consisting of formic acid, acetic acid, propionic acid, butyric acid, lactic acid, glycolic acid, benzoic acid and derivatives thereof. One alone or two or more kinds may be used either singly or as combined for the component (C).

The cyclic carbonate of the component (D) is used as needed from the viewpoint of lowering the reactivity between the epoxy resin curing agent and the epoxy resin for operability improvement. From the viewpoint of the reactivity with the component (A), a 6-membered or less cyclic carbonate is preferred.

For example, there are mentioned ethylene carbonate, propylene carbonate, glycerin carbonate, 1,2-butylene carbonate, vinylene carbonate, 4-vinyl-1,3-dioxolan-2-one, 4-methoxymethyl-1,3-dioxolan-2-one, 1,3-dioxan-2-one, etc. Among these, from the viewpoint of chemical resistance, at least one selected from the group consisting of ethylene carbonate, propylene carbonate and glycerin carbonate is preferred, and ethylene carbonate is more preferred. One alone or two or more kinds may be used either singly or as combined for the component (D).

The monoepoxy compound for the component (E) is a monoepoxy compound having 2 to 20 carbon atoms, and is used as needed from the viewpoint of lowering the reactivity between the epoxy resin curing agent and the epoxy resin for operability improvement. From the viewpoint of chemical resistance, a monoepoxy compound having 2 to 10 carbon atoms is preferred, and a compound represented by the following formula (2) is more preferred:

(2)

wherein $R^4$ represents a hydrogen atom, an alkyl group having 1 to 8 carbon atoms, an aryl group, or $R^5$—O—$CH_2$—, and $R^5$ represents a phenyl group or a benzyl group.

Examples of the monoepoxy compound represented by the formula (2) include ethylene oxide, propylene oxide, 1,2-butylene oxide, styrene oxide, phenyl glycidyl ether, benzyl glycidyl ether, etc. One alone or two or more kinds may be used either singly or as combined for the component (E).

In the case where the components (C), (D) and (E) are used for the epoxy resin curing agent for use in this embodiment, any one alone or two or more of (C), (D) and (E) may be used either singly or as combined.

The epoxy resin curing agent for use in this embodiment may be a reaction product prepared by reacting the above-described (A) to (E) and additionally any other component within a range not detracting from the advantageous effects of the present invention. Here, examples of the other component include an aromatic dicarboxylic acid and a derivative thereof.

However, the amount of the "other component" to be used is preferably 30% by mass or less of the total amount of the reaction product that constitutes the epoxy resin curing agent, more preferably 10% by mass or less, even more preferably 5% by mass or less.

The reaction product of the above (A) and (B) and further at least one compound selected from the above (C), (D) and (E) is obtained by using at least one compound selected from (C), (D) and (E) along with the above (B) and reacting them with the above (A) of a polyamine. Regarding the reaction, the above (B) to (E) may be added to and reacted with the above (A) in any arbitrary order, or the above (B) to (E) may be mixed and then reacted with the above (A).

The reaction of the above (A) and the above (C) may be carried out under the same condition as that for the reaction of the above (A) and (B). In the case where the above (C) is used, the above (B) and the (C) may be mixed and then reacted with the above (A), or the above (A) and (B) may be reacted first and then reacted with the above (C).

On the other hand, in the case where the above (D) and/or (E) are used, preferably, the above (A) and (B) are first reacted and then reacted with the above (D) and/or (E).

Regarding the reaction between the above (A) and the above (D) and/or (E), (A) is mixed with (D) and/or (E) under the condition of 25 to 200° C., and then subjected to addition reaction for urethane bond forming reaction under the condition of 30 to 180° C., preferably 40 to 170° C. As needed, a catalyst such as sodium methoxide, sodium ethoxide, potassium t-butoxide or the like may be used.

In the urethane bond forming reaction, for promoting the reaction as needed, (D) and/or (E) may be melted or may be diluted with a nonreactive solvent before use.

Also in the case where the epoxy resin curing agent in this embodiment is a reaction product of the above (A) and (B) and further at least one compound selected from the above (C), (D) and (E), the reaction molar ratio of the above (B) to (A) [(B)/(A)] is, for the same reason as above, preferably within a range of 0.3 to 1.0, more preferably within a range of 0.5 to 1.0, even more preferably within a range of 0.6 to 1.0. On the other hand, the reaction molar ratio of the above (C), (D) and (E) to the above (A) [{(C)+(D)+(E)}/(A)] may be any ratio falling within a range of 0.05 to 3.1, but is preferably within a range of 0.07 to 2.5, more preferably within a range of 0.1 to 2.0, even more preferably within a range of 0.1 to 1.0, further more preferably within a range of 0.1 to 0.7.

However, from the viewpoint of chemical resistance and coatability, the reaction molar ratio of the above (B) to (E) to the above (A) [{(B)+(C)+(D)+(E)}/(A)] is preferably within a range of 0.35 to 2.5, more preferably within a range of 0.35 to 2.0, even more preferably within a range of 0.35 to 1.5.

In the epoxy resin curing agent in this embodiment, from the viewpoint of the curability of the epoxy resin, the active hydrogen equivalent as a resin solid content is preferably within a range of 30 to 400, more preferably 50 to 300.

[Solvent]

The coating film of the present invention is a coating film formed by curing the epoxy resin composition that contains at least an epoxy resin, an epoxy resin curing agent and a solvent, and in this embodiment, the solvent is contained in a specific amount in the cured product (coating film) formed by curing the epoxy resin with the epoxy resin curing agent, therefore expressing good appearance and high chemical resistance.

The content of the solvent in the coating film (cured product) is within a range of 1% by mass or more and 20% by mass or less, preferably within a range of 1.5% by mass or more and 18% by mass or less, even more preferably within a range of 2% by mass or more and 15% by mass or less, still more preferably within a range of 3.0% by mass or more and 13.0% by mass or less.

When the content of the solvent in the coating film is 1% by mass or more, the appearance of the coating film is prevented from being worsened owing to cissing or wrinkling, or the chemical resistance of the coating film to specific chemicals is prevented from being lowered. On the other hand, when the content of the solvent in the coating film is 20% by mass or less, chemical resistance can also be prevented from being lowered owing to reduction in the crosslinking density in the coating film.

The epoxy resin curing agent has a skeleton that contains a large amount of an amine having an active hydrogen in the curing agent, and therefore the cured product to be obtained by reacting the epoxy resin with the curing agent can generally have a high degree of hydrophilicity, but since the coating film contains a specific amount of a solvent remaining therein, suitable hydrophobicity can be expressed in the film. It is presumed that this would have some influence on improvement of the chemical resistance (salt spray resistance, hydrous methanol resistance, etc.) of the coating film.

The solvent for use in this embodiment may be any one capable of dissolving the epoxy resin and the epoxy resin curing agent to be used in this embodiment, and may be any of alcohol-type, ether-type, ester-type, glycol ether-type, ketone-type, cellosolve-type, halogen-containing hydrocarbon-type or hydrocarbon-type compounds.

Specifically, the solvent usable in this embodiment includes at least one solvent selected from alcohol compounds such as methanol, ethanol, 2-propanol, 1-propanol, 2-methyl-1-propanol, 1-butanol, 2-butanol, etc.; ether compounds such as tetrahydrofuran, diethyl ether, etc.; ester compounds such as methyl acetate, ethyl acetate, propyl acetate, isobutyl acetate, butyl acetate, amyl acetate, etc.; glycol ether compounds such as 3-methoxy-3-methylbutanol, 3-methoxy-3-methylbutyl acetate, 1-methoxy-2-propanol, 1-methoxypropyl-2-acetate, 1-ethoxy-2-propanol, propylene glycol monopropyl ether, 3-methoxybutyl acetate, ethyl 3-ethoxypropionate, propylene glycol monomethyl ether propionate, diethylene glycol monobutyl ether, triethylene glycol monobutyl ether, etc.; ketone compounds such as acetone, methyl ethyl ketone, methyl isobutyl ketone, diisobutyl ketone, cyclohexanone, methylcyclohexanone, 4-hydroxy-4-methyl-2-pentanone, isophorone, etc.; cellosolves such as ethylene glycol monomethyl ether, ethylene glycol monoethyl ether, ethylene glycol mono-normal butyl ether, ethylene glycol mono-tertiary butyl ether, 2-methoxymethyl acetate, 2-ethoxyethyl acetate, etc.; halogenohydrocarbon compounds such as dichloromethane, trichloroethylene, tetrachloroethylene, carbon tetrachloride, 1,1,1-trichloroethane, 1,2-dichloropropane, 1,1-dichloro-1-fluoroethane, etc.; hydrocarbon compounds such as benzene, toluene, p-xylene, m-xylene, o-xylene, normal hexane, cyclohexane, methylcyclohexane, normal heptane, styrene, ethylbenzene, etc.; hydrocarbon mixtures such as gasoline, kerosene, terpene oil, mineral spirit, etc.

For controlling the evaporation rate of the solvent, various kinds of the above-described solvents may be mixed in a suitable ratio before use. Among them, in consideration of uniform dissolution of epoxy resin and/or epoxy resin curing agent and of expression of higher chemical resistance, at least one selected from the group consisting of alcohol compounds, glycol ether compounds and hydrocarbon compounds is preferred, at least one selected from the group consisting of alcohol compounds and hydrocarbon compounds is more preferred, and at least one selected from alcohol compounds and aromatic ring-having hydrocarbon compounds is even more preferred.

Among the alcohol compounds, at least one selected from the group consisting of methanol, ethanol, 2-propanol, 1-propanol, 2-methyl-1-propanol, 1-butanol and 2-butanol is preferred, at least one selected from the group consisting of ethanol, 2-propanol, 1-propanol, 2-methyl-1-propanol, 1-butanol and 2-butanol is more preferred, and 1-butanol is even more preferred. Among the aromatic ring-having hydrocarbon compounds, at least one selected from the group consisting of toluene, p-xylene, m-xylene, o-xylene, styrene and ethylbenzene is preferred, and at least one selected from the group consisting of toluene, p-xylene, m-xylene and o-xylene is more preferred.

In consideration of uniform dissolution of epoxy resin and/or epoxy resin curing agent and of expression of higher chemical resistance, the solvent is more preferably a combination of an alcohol compound and an aromatic ring-having hydrocarbon compound. It is considered that, by using an aromatic ring-having hydrocarbon compound as the solvent, the chemical resistance of the coating film could be enhanced owing to the estimated mechanism mentioned above. In addition, it is considered that, by using an alcohol compound as the solvent, epoxy resin and/or epoxy resin curing agent could be uniformly dissolved and solvent evaporation could be prevented, whereby the chemical resistance of the coating film could be maintained for a long period of time.

In the case where an alcohol compound and an aromatic ring-having hydrocarbon compound are used as combined, the ratio of the two is not specifically limited but is preferably within a range of 99/1 to 1/99 by mass, more preferably 99/1 to 10/90, even more preferably 90/10 to 20/80, still more preferably 90/10 to 40/60.

In this embodiment, the evaporation rate of the solvent is preferably 0.10 or more and 4.5 or less as a relative value (hereinafter this may be referred to as "relative evaporation rate") when the evaporation rate of butyl acetate is taken as 1 being a standard value, more preferably 0.20 or more and 4.2 or less, even more preferably 0.30 or more and 4.0 or less, still more preferably 0.30 or more and 3.0 or less, further more preferably 0.30 or more and 2.5 or less, even further more preferably 0.30 or more and 2.0 or less, still further more preferably 0.30 or more and 1.5 or less.

When the evaporation rate is more than 0.10, the evaporation amount of the solvent from the coating film is extremely small so that the crosslinking density and the chemical resistance of the coating film can be prevented from lowering. On the other hand, when the evaporation rate is less than 4.5, worsening of the appearance of the coating film and reduction in the chemical resistance thereof to specific chemicals owing to rapid solvent evaporation can be prevented.

Examples of the solvent satisfying the above requirements include the following. In the following exemplifications, the parenthesized numeral indicates the relative evaporation rate.

Methanol (1.9), ethanol (1.54), 2-propanol (1.5), 1-butanol (0.47), 2-butanol (0.89), ethyl acetate (4.2), propyl acetate (2.14), isobutyl acetate (1.45), butyl acetate (1.0), 1-methoxy-2-propanol (0.71), 1-methoxypropyl-2-acetate (0.44), 1-ethoxy-2-propanol (0.34), methyl ethyl ketone (3.7), methyl isobutyl ketone (1.6), cyclohexanone (0.32), ethylene glycol monomethyl ether (0.53), ethylene glycol monoethyl ether (0.38), trichloroethylene (3.22), tetrachloroethylene (1.29), toluene (2.0), m-xylene (0.76), cyclohexane (4.5), methylcyclohexane (3.2), normal heptane (3.62), benzene (4.12).

The relative evaporation rate of solvent is an index that is well used in the field of paints, and can be known from known references, etc. The relative evaporation rate of solvent may be determined according to ASTM D3539-76.

From the viewpoint of maintaining chemical resistance of the coating film, the solvent contained in the coating film of the present invention preferably contains a solvent having a relative evaporation rate of 0.60 or less, preferably 0.50 or less, in a ratio of 50% by mass or more, more preferably 60% by mass or more, even more preferably 70% by mass or more.

The solvent may be one contained in the epoxy resin and/or the epoxy resin curing agent, or may be added when the epoxy resin and/or the epoxy resin curing agent are blended.

[Epoxy Resin Composition]

The epoxy resin composition for use in this embodiment contains at least the above-described epoxy resin, the above-described epoxy resin curing agent and a solvent.

In this embodiment, the total mass of the epoxy resin and the epoxy resin curing agent in the epoxy resin composition is preferably 5 to 70% by mass, more preferably 10 to 65% by mass, even more preferably 15 to 60% by mass, still more preferably 25 to 60% by mass, further more preferably 30 to 60% by mass.

The solvent contained in the epoxy resin composition and preferred embodiments thereof are the same as mentioned above. From the viewpoint of easy controlling the solvent amount to be contained in the coating film of the present invention to fall within a predetermined range, the solvent to be contained in the epoxy resin composition preferably contains a solvent having a relative evaporation rate of 0.60 or less, preferably 0.50 or less, in a ratio of 30% by mass or more based on the total mass of the solvent in the epoxy resin composition, more preferably 40% by mass or more, even more preferably 50% by mass or more.

The blending ratio of the epoxy resin to the epoxy resin curing agent in the epoxy resin composition may fall within a standard blending range in the case of generally producing an epoxy resin reaction product through reaction of an epoxy resin and an epoxy resin curing agent. Specifically, it is preferable that the ratio of the number of the active amine hydrogens in the epoxy resin curing agent to the number of the epoxy groups in the epoxy resin (number of active amine hydrogens in epoxy resin curing agent/number of epoxy groups in epoxy resin) falls within a range of 0.05 to 12.0, more preferably within a range of 0.05 to 10.0, even more preferably within a range of 0.1 to 8.0, still more preferably within a range of 0.2 to 5.0, further more preferably within a range of 0.3 to 4.0, still further more preferably within a range of 0.4 to 3.0, and even further more preferably within a range of 0.5 to 2.0.

As needed, a thermosetting resin composition such as a polyurethane resin composition, a polyacryl resin composition, a polyurea resin composition or the like may be mixed in the epoxy resin composition in this embodiment, within a range not detracting from the advantageous effects of the present invention.

In the case where the epoxy resin composition is applied to an ordinary substrate of iron plates, various plastics or the like in this embodiment, a wetting agent of a silicone or acrylic compound may be added to the epoxy resin composition for assisting surface wetting of various substrates. Adequate wetting agents include BYK331, BYK333, BYK340, BYK347, BYK348, BYK378, BYK380, BYK381 and the like available from BYK-Chemie GmbH. In the case where these are added, the amount thereof is preferably within a range of 0.01 to 2.0% by mass based on the total mass of the epoxy resin composition.

For enhancing adhesiveness to various materials, as needed, a tackifier agent such as a xylene resin, a terpene resin, a phenolic resin, a rosin resin or the like may be added. In the case of adding these, the amount thereof is preferably within a range of 0.01 to 2.0% by mass based on the total mass of the epoxy resin composition. For enhancing the adhesiveness to various materials, a coupling agent such as a silane coupling agent, a titanium coupling agent or the like may be added. In the case of adding these, the amount thereof is preferably within a range of 0.01 to 5.0% by mass based on the total mass of the epoxy resin composition.

To improve properties, such as impact resistance, the epoxy resin composition may be added with inorganic filler, such as silica, alumina, mica, talc, aluminum flake, and glass flake. The organic filler may be added preferably 0.01 to 10.0% by mass based on the total mass of the epoxy resin composition.

In the case where the epoxy resin composition is applied to an ordinary substrate of iron plates, plastics or the like in this embodiment, a defoaming agent of a silicone-type or acrylic compound may be added to the epoxy resin composition in this embodiment, for assisting removal of foams to form during stirring and mixing or during coating. As a suitable defoaming agent, there are mentioned BYK019, BYK052, BYK065, BYK066N, BYK067N, BYK070, BYK080 and others available from BYK-Chemie GmbH. Among these, BKY065 is particularly preferable. In the case where these are added, the amount thereof is preferably within a range of 0.01 to 3.0% by mass based on the total mass of the epoxy resin composition.

As needed, and for enhancing the low-temperature curability thereof, the epoxy resin composition in this embodiment may be added with various additives, for example, a curing accelerating catalyst such as a boron trifluoride amine complex such as boron trifluoride monoethylamine complex, etc.; a boron trifluoride ether complex such as boron trifluoride dimethyl ether complex, boron trifluoride diethyl ether complex, boron trifluoride di-n-butyl ether complex, etc.; an imidazole such as 2-phenylimidazole, etc.; benzoic acid, salicylic acid, N-ethylmorpholine, dibutyl tin dilaurate, cobalt naphthenate, stannous chloride, etc.; a rustproof additive such as zinc phosphate, iron phosphate, calcium molybdate, vanadium oxide, water-dispersed silica, fumed silica, etc.; an organic pigment such as a phthalocyanine-type organic pigment, a condensed polycyclic organic pigment, etc.; an inorganic pigment such as titanium oxide, zinc oxide, calcium carbonate, barium sulfate, alumina, carbon black, etc., each in a necessary amount by ratio.

As needed and for viscosity control, the epoxy resin composition in this embodiment may be added with, for example, a diluting agent such as benzyl alcohol, furfuryl alcohol, tetrafurfuryl alcohol, etc., or an amine such as metaxylylenediamine, 1,3-bis(aminomethyl)cyclohexane, Jeffamine D230, etc., within a range not detracting from the advantageous effects of the present invention. In the case where these are added, the amount thereof is preferably within a range of 1.0 to 20.0% by mass based on the total mass of the epoxy resin composition, more preferably within a range of 5.0 to 10.0% by mass.

The thickness of the coating film of the present invention is not specifically limited, and may be adequately selected in accordance with the intended use. For example, the thickness of the coating film may be set within a range of 10 to 2000 μm, preferably 50 to 1000 μm.

[Production Method for Coating Film]

The coating film of the present invention is formed by curing the above-described epoxy resin composition, and as mentioned above, the content of the solvent in the coating film (cured product) of this embodiment falls within a range of 1% by mass or more and 20% by mass or less. For controlling the solvent content in the coating film to fall within the specific range, a suitable concentration of the epoxy resin composition (coating liquid), a suitable coating condition, a suitable curing condition, and a suitable conditioning for the solvent amount in the coating film are necessary. These condition may vary depending on the selected epoxy resin, epoxy resin curing agent, and solvent. Further, the concentration of the epoxy resin composition may have various states until the case of reaching a composition concentration of about 5% by mass using a suitable kind of an organic solvent and/or water, depending on the kind and the molar ratio of the selected materials.

A preferred concentration of the epoxy resin composition is as mentioned above.

A production method for the coating film of the present invention includes, for example, applying the epoxy resin composition onto a substrate to form thereon a coating film of the epoxy resin composition (coating step) and then curing the coating film (curing step). For controlling the solvent amount in the coating film to fall within a predetermined range, as needed, a step of controlling the solvent amount (solvent amount controlling step) may be carried out after the curing.

The temperature at coating in producing a coating film from the epoxy resin composition in this embodiment is preferably 0° C. to 60° C., more preferably 5° C. to 50° C., even more preferably 10° C. to 45° C., still more preferably 10° C. to 30° C. The coating step is preferably carried out in an atmosphere where the temperature and the humidity can be kept constant, for example, in a thermo-hygrostat oven or the like. Regarding the coating mode, for example, any coating mode generally used in the art, such as roll coating, applicator coating, bar coater coating, Mayer bar coating, air knife coating, gravure coating, reverse gravure coating, microgravure coating, micro-reverse gravure coater coating, die coater coating, slot die coater coating, vacuum die coater coating, dip coating, spin coating, spray coating, brush coating, etc. Industrially, roll coating or spray coating is preferred.

The thickness of the coating film may be adequately selected depending on the use of the resultant coating film and the desired thickness thereof.

The curing temperature in this embodiment may be selected within a range of 0° C. to 140° C. The curing temperature is preferably 0° C. to 120° C., more preferably 5° C. to 100° C., even more preferably 10° C. to 80° C., still more preferably 10° C. to 50° C., further more preferably 10° C. to 30° C. The curing time is preferably 5 seconds to 7 days, more preferably 10 seconds to 2 days, even more preferably 30 seconds to 1.5 days. Here, regarding the curing time in this description, the resin composition is applied onto a substrate with an applicator, then using a paint drying time measuring device of No. 404 manufactured by Taiyu Kizai Co., Ltd., the coating film formed on the substrate at a predetermined temperature is scratched with a steel needle, and the scratched track is visually observed, and the time taken until the scratch disappears is counted to be the curing time. Even at the time when the scratch has disappeared, solvent still remains in the coating film.

Regarding the combination of preferred temperature and time as the curing condition for the epoxy resin composition, for example, it is preferable that the curing temperature of the epoxy resin composition is 0 to 50° C. and the curing time is 0.5 to 48 hours, and it is more preferable that the curing temperature is 5 to 40° C. and the curing time is 1.5 to 36 hours.

Subsequently, the temperature in the step of controlling the solvent amount in the coating film (solvent amount controlling step) is selected within a range of 5° C. to 120° C. The temperature in solvent amount control may differ from the curing temperature. The temperature in the solvent amount controlling step is preferably 5 to 100° C., more preferably 5 to 80° C., even more preferably 5 to 60° C., still more preferably 5 to 50° C., further more preferably 5 to 40° C., still further more preferably 5 to 30° C., and still further more preferably 10 to 30° C. The time for solvent amount control is preferably within 10 days, more preferably within 8 days, even more preferably within 7 days.

In the case where a desired solvent content can be attained in the curing step, the solvent amount controlling step may be omitted.

The solvent content in the coating film is, for example, measured according to the method described in the section of Examples to be given hereinunder.

In the production method for the coating film of the present invention, all the steps of the coating step, the curing step and the solvent amount controlling step are carried out at 50° C. or lower. Accordingly, it becomes easy to prevent the solvent amount in the coating film from overstepping the defined range. More preferably, all the steps of the coating step, the curing step and the solvent amount controlling step are carried out at 40° C. or lower, even more preferably at 30° C. or lower.

In the case where the coating film is needed to be stored after formation, the coating film is stored preferably at 0 to 60° C. from the viewpoint of preventing the solvent amount in the coating film from overstepping the defined range, more preferably at 5 to 50° C., even more preferably at 10 to 45° C., still more preferably at 10 to 30° C.

The temperature in use of the coating film is preferably 0 to 50° C. Within the range, the solvent amount in the coating film can be prevented from overstepping the defined range. More preferably, the temperature is 5 to 45° C., even more preferably 10 to 40° C., still more preferably 10 to 30° C.

[Use]

The coating film of this embodiment can be used in a broad field of applications, for example, for coating materials or adhesives for concrete, cement mortar, various metals, leather, glass, rubber, plastics, wood, cloth, paper, etc.; adhesives for wrapping adhesive tapes, adhesive labels, frozen food labels, removable labels, POS labels, adhesive wall papers, adhesives for adhesive floor materials; processed papers such as art papers, lightweight coated papers, cast coated papers, coated board papers, carbonless copying machines, impregnated papers, etc.; fiber treating agents such as bundling agents for natural fibers, synthetic fibers, glass fibers, carbon fibers, metal fibers, etc., fraying inhibitors, processing agents etc.; building materials such as sealants, cement mixtures, waterproofing materials, etc. Among these, the coating film is favorable for use for coating materials. In particular, the coating film is favorable for coating materials, such as a coating material for ships, a heavy-duty coating material, a coating material for tanks, a coating material for inner surfaces of pipes, an exterior coating material, or a coating material for floors. Specifically, the epoxy resin composition to form the coating film of this embodiment is favorable for use for a coating material for ships, a heavy-duty coating material, a coating material for tanks, a coating material for inner surfaces of pipes, an exterior coating material, or a coating material for floors.

[Method for Improving Chemical Resistance]

The present invention also provides a method for improving chemical resistance of a coating film (hereinafter this may be referred to as "method of the present invention"). The method of the present invention is a method for improving chemical resistance of a coating film, wherein the coating film is formed by curing of an epoxy resin composition containing at least an epoxy resin, an epoxy resin curing agent and a solvent, the epoxy resin curing agent is a reaction product of the following (A) and (B), and the coating film contains the solvent in a ratio of 1% by mass or more and 20% by mass or less.

(A) At least one selected from the group consisting of metaxylylenediamine and paraxylylenediamine.

(B) At least one selected from the group consisting of an unsaturated carboxylic acid represented by the following formula (1) and a derivative thereof.

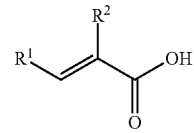

(1)

wherein $R^1$ and $R^2$ are the same as above.

According to the method of the present invention, a specific amount of a solvent is contained in the coating film formed by curing of a specific epoxy resin composition, therefore expressing good appearance and high chemical resistance. The solvent content in the coating film is within a range of 1% by mass or more and 20% by mass or less, preferably within a range of 1.5% by mass or more and 18% by mass or less, more preferably within a range of 2% by mass or more and 15% by mass or less, even more preferably within a range of 3.0% by mass or more and 13.0% by mass or less. When the solvent content in the coating film is 1% by mass or more, the appearance of the coating film can be prevented from worsening owing to cissing or wrinkling and the chemical resistance thereof to specific chemicals can be prevented from lowering. On the other hand, when the solvent content in the coating film is 20% by mass or less, the chemical resistance of the coating film can be prevented from lowering owing to reduction in the crosslinking density in the coating film.

The epoxy resin, the epoxy resin curing agent, the solvent, the epoxy resin composition, the coating film production method and preferred embodiments thereof in the method of the present invention are the same as mentioned above.

EXAMPLES

Next, the present invention is described concretely with reference to Examples. However, the present invention is not whatsoever restricted by these Examples.

The method for performance evaluation for the coating film is as mentioned below.

<Appearance>

The coating film produced according to the method described in Examples and Comparative Examples was visually evaluated.

C: Cissing was seen.
B: Cissing was seen a little.
A: No cissing.

<Salt Spray Resistance>

Regarding salt spray resistance of the coating film produced according to the method described in Examples and Comparative Examples, salt water was sprayed onto the coating film using a salt spray tester, and the appearance of the resultant coating film was visually evaluated.

Device: Suga Test Instruments Co. Ltd., Salt Spray Tester STP-90
Salt water concentration: 5% by mass
Temperature settled in tank: 35° C.
Temperature settled in humidifier: 47° C.
Test time: 28 days
C: Rusted.
B: Rusted a little.
A: No rust.

<Hydrous Methanol Resistance>

Regarding the hydrous methanol resistance of the coating film produced according to the method described in Examples and Comparative Examples, the coating film was immersed in hydrous methanol, and then the appearance of the coating film was visually evaluated.

Hydrous methanol: methanol/water=9/1 (ratio by mass)
Storing temperature: 23° C.
Storing period: 28 days
C: Swelled.
B: Swelled a little.
A: No swelling.

<Sulfuric Acid Resistance>

Regarding the sulfuric acid resistance of the coating film produced according to the method described in Examples and Comparative Examples, the coating film was immersed in 10% sulfuric acid, and then the appearance thereof was visually evaluated.

Storing temperature: 23° C.
Storing period: 7 days
D: Rusted.
C: Rusted a little.
B: The coating film swelled but did not rust.
A: Neither swelling nor rusting was seen in the coating film.

<Solvent Content in Coating Film>

The solvent content in the coating film produced according to the method described in Examples and Comparative Examples was measured through gas chromatography. The proportion of each solvent was calculated based on the calibration curve thereof.

Pretreatment method: The coating film was put into a 500-mL flask whose volume was measured, sealed up with a silicone stopper, and heated at 100° C./30 minutes. The vapor in the flask after the heating was measured.

Device: GC-390B manufactured by GL Sciences Inc.
Column: AQUATIQ2 manufactured by GL Sciences Inc., inner diameter 0.53 mm, length 30 m, film thickness 3.00 µm.
Injection temperature: 150° C.
Detection temperature: 150° C.
Column temperature: 40° C./8 min→heating (10° C./min)→80° C./8 min
Sample injection amount: 0.5 mL Solvent content calculation method: According to the above-described method, the solvent content per m² of the coating film was calculated based on the calibration curve, and on the basis of the value, the proportion of the solvent to the total mass of the coating film was calculated.

Epoxy resin curing agents A to E were prepared according to the methods mentioned below.

(Epoxy Resin Curing Agent A)

1 mol of metaxylylenediamine (hereinafter this may be referred to as MXDA) was put into a reactor. This was heated up to 60° C. in a nitrogen stream atmosphere, and 0.93 mol of methyl acrylate (this may be referred to as MA) was dropwise added thereto taking 1 hour. With the formed methanol kept evaporated away, this was heated up to 165° C., and kept at 165° C. for 2.5 hours. A corresponding amount of ethanol was dropwise added thereto so that the solid concentration could be 50% by mass, taking 1.5 hours, and an epoxy resin curing agent A was thus produced.

(Epoxy Resin Curing Agent B)

1 mol of metaxylylenediamine was put into a reactor. This was heated up to 60° C. in a nitrogen stream atmosphere, and 0.93 mol of methyl acrylate was dropwise added thereto taking 1 hour. With the formed methanol kept evaporated away, this was heated up to 165° C., and kept at 165° C. for 2.5 hours. A corresponding amount of 1-butanol was dropwise added thereto so that the solid concentration could be 50% by mass, taking 1.5 hours, and an epoxy resin curing agent B was thus produced.

(Epoxy Resin Curing Agent C) 1 mol of metaxylylenediamine was put into a reactor. This was heated up to 60° C. in a nitrogen stream atmosphere, and 0.93 mol of methyl acrylate was dropwise added thereto taking 1 hour. With the formed methanol kept evaporated away, this was heated up to 165° C., and kept at 165° C. for 2.5 hours. A corresponding amount of 1-butanol/toluene=55/45 (ratio by mass) was dropwise added thereto so that the solid concentration could be 50% by mass, taking 1.5 hours, and an epoxy resin curing agent C was thus produced.

(Epoxy Resin Curing Agent D)

1 mol of metaxylylenediamine and 0.93 mol of methyl methacrylate (hereinafter this may be referred to as MMA) were put into a reactor. This was stirred at 100° C. in a nitrogen stream atmosphere for 5 hours. With the formed methanol kept evaporated away, this was heated up to 165° C., and kept at 165° C. for 2.5 hours. A corresponding amount of 1-butanol was dropwise added thereto so that the solid concentration could be 50% by mass, taking 1.5 hours, and an epoxy resin curing agent D was thus produced.

(Epoxy Resin Curing Agent E)

1 mol of metaxylylenediamine was put into a reactor. This was heated up to 60° C. in a nitrogen stream atmosphere, and 0.88 mol of methyl acrylate was dropwise added thereto taking 1 hour. With the formed methanol kept evaporated away, this was heated up to 165° C., and kept at 165° C. for 2.5 hours. After cooled down to 100° C., a predetermined amount of 1-butanol was dropwise added thereto so that the solid concentration could be 50% by mass, and after cooled down to 65° C., 0.27 mol of molten ethylene carbonate (hereinafter this may be referred to as EC) was dropwise added thereto taking 30 minutes. This was kept at 65° C. for 5 hours to give an epoxy resin curing agent E.

The blending ratio of each component in the epoxy resin curing agents A to E is shown in Table 1. In Table 1, the blending ratio of MXDA, MA, MMA and EC is in terms of the molar ratio thereof based on the molar amount of MXDA of 100.

The active hydrogen equivalent of the epoxy resin curing agents A to E was determined through calculation. "Active hydrogen equivalent (solution)" is the active hydrogen equivalent relative to the total amount of the epoxy resin curing agent containing the solvent, and "active hydrogen equivalent (solid)" is a value relative to the resin solid content of the epoxy resin curing agent.

TABLE 1

| Epoxy Resin Curing Agent | MXDA | MA | MMA | EC | Solvent | Solid Concentration (mass %) | Active Hydrogen Equivalent (solution) | Active Hydrogen Equivalent (solid) |
|---|---|---|---|---|---|---|---|---|
| A | 100 | 93 | | | ethanol | 50 | 308 | 154 |
| B | 100 | 93 | | | 1-butanol | 50 | 308 | 154 |
| C | 100 | 93 | | | 1-butanol/toluene = 55/45 | 50 | 308 | 154 |
| D | 100 | | 93 | | 1-butanol | 50 | 330 | 165 |
| E | 100 | 88 | | 27 | 1-butanol | 50 | 506 | 253 |

Examples 1 to 13 and Comparative Examples 1 to 3

Example 1

222 parts by mass of the epoxy resin curing agent A, and 100 parts by mass of an epoxy resin having a glycidyloxy group derived from bisphenol A (jER828, manufactured by Mitsubishi Chemical Corporation, solid concentration: 100% by mass), and as a solvent, 111 parts by mass of 1-butanol were prepared and well stirred to give an epoxy resin composition (number of active amine hydrogens in epoxy resin curing agent/number of epoxy groups in epoxy resin=1.2). The solvent content in the resultant epoxy resin composition is shown in Table 2.

Next, using an applicator, the resin composition was applied onto a substrate, zinc phosphate-processed iron plate (SPCC-SD PB-N144, manufactured by Paltek Corporation, 0.8×70×150 mm) at 23° C. (thickness of the coating film: 200 μm (immediately after coating)), and cured (curing temperature: 23° C., curing time: 3.5 hours). Immediately after the curing step, the solvent content was measured according to the above-described method. The result is shown in Table 3. Further, after the curing step, the solvent amount was controlled under the condition of 23° C./7 days to give a coating film.

The formed coating film was tested according to the above-described methods to evaluate the appearance, the salt spray resistance, the hydrous methanol resistance, the sulfuric acid resistance and the solvent content thereof. The results are shown in Table 4.

Example 2

65.7 parts by mass of the epoxy resin curing agent A, and 100 parts by mass of an epoxy resin having a glycidyloxy group derived from bisphenol A (jER1001X75, manufactured by Mitsubishi Chemical Corporation, solid concentration: 75% by mass), and as a solvent, 57.9 parts by mass of 1-butanol were prepared and well stirred to give an epoxy resin composition (number of active amine hydrogens in epoxy resin curing agent/number of epoxy groups in epoxy resin=1.2). The solvent content in the resultant epoxy resin composition is shown in Table 2.

Next, using an applicator, the resin composition was applied onto a substrate, zinc phosphate-processed iron plate (SPCC-SD PB-N144, manufactured by Paltek Corporation, 0.8×70×150 mm) at 23° C. (thickness of the coating film: 200 μm (immediately after coating)), and cured (curing temperature: 23° C., curing time: 3.5 hours). Immediately after the curing step, the solvent content was measured according to the above-described method. The result is shown in Table 3. Further, after the curing step, the solvent amount was controlled under the condition of 23° C./7 days to give a coating film.

The formed coating film was tested according to the above-described methods to evaluate the appearance, the salt spray resistance, the hydrous methanol resistance, the sulfuric acid resistance and the solvent content thereof. The results are shown in Table 4.

Example 3

416 parts by mass of the epoxy resin curing agent A, and 100 parts by mass of an epoxy resin having a glycidylamino group derived from metaxylylenediamine (TETRAD-X, manufactured by Mitsubishi Gas Chemical Company, Inc., solid concentration: 100% by mass), and as a solvent, 208 parts by mass of 1-butanol were prepared and well stirred to give an epoxy resin composition (number of active amine hydrogens in epoxy resin curing agent/number of epoxy groups in epoxy resin=1.2). The solvent content in the resultant epoxy resin composition is shown in Table 2.

Next, using an applicator, the resin composition was applied onto a substrate, zinc phosphate-processed iron plate (SPCC-SD PB-N144, manufactured by Paltek Corporation, 0.8×70×150 mm) at 23° C. (thickness of the coating film: 200 μm (immediately after coating)), and cured (curing temperature: 23° C., curing time: 3.0 hours). Immediately after the curing step, the solvent content was measured according to the above-described method. The result is shown in Table 3. Further, after the curing step, the solvent amount was controlled under the condition of 23° C./7 days to give a coating film.

The formed coating film was tested according to the above-described methods to evaluate the appearance, the salt spray resistance, the hydrous methanol resistance, the sulfuric acid resistance and the solvent content thereof. The results are shown in Table 4.

Example 4

65.7 parts by mass of the epoxy resin curing agent B, and 100 parts by mass of an epoxy resin having a glycidyloxy group derived from bisphenol A (jER1001X75, manufactured by Mitsubishi Chemical Corporation, solid concentration: 75% by mass), and as a solvent, 57.9 parts by mass of 1-butanol were prepared and well stirred to give an epoxy resin composition (number of active amine hydrogens in epoxy resin curing agent/number of epoxy groups in epoxy resin=1.2). The solvent content in the resultant epoxy resin composition is shown in Table 2.

Next, using an applicator, the resin composition was applied onto a substrate, zinc phosphate-processed iron plate (SPCC-SD PB-N144, manufactured by Paltek Corporation, 0.8×70×150 mm) at 23° C. (thickness of the coating film: 200 μm (immediately after coating)), and cured (curing temperature: 23° C., curing time: 4.5 hours). Immediately after the curing step, the solvent content was measured according to the above-described method. The result is shown in Table 3. Further, after the curing step, the solvent amount was controlled under the condition of 23° C./7 days to give a coating film.

The formed coating film was tested according to the above-described methods to evaluate the appearance, the salt spray resistance, the hydrous methanol resistance, the sulfuric acid resistance and the solvent content thereof. The results are shown in Table 4.

Example 5

65.7 parts by mass of the epoxy resin curing agent C, and 100 parts by mass of an epoxy resin having a glycidyloxy group derived from bisphenol A (jER1001X75, manufactured by Mitsubishi Chemical Corporation, solid concentration: 75% by mass), and as a solvent, 57.9 parts by mass of 1-butanol were prepared and well stirred to give an epoxy resin composition (number of active amine hydrogens in epoxy resin curing agent/number of epoxy groups in epoxy resin=1.2). The solvent content in the resultant epoxy resin composition is shown in Table 2.

Next, using an applicator, the resin composition was applied onto a substrate, zinc phosphate-processed iron plate (SPCC-SD PB-N144, manufactured by Paltek Corporation, 0.8×70×150 mm) at 23° C. (thickness of the coating film: 200 μm (immediately after coating)), and cured (curing temperature: 23° C., curing time: 4.0 hours). Immediately after the curing step, the solvent content was measured according to the above-described method. The result is shown in Table 3. Further, after the curing step, the solvent amount was controlled under the condition of 23° C./7 days to give a coating film.

The formed coating film was tested according to the above-described methods to evaluate the appearance, the salt spray resistance, the hydrous methanol resistance, the sulfuric acid resistance and the solvent content thereof. The results are shown in Table 4.

Example 6

65.7 parts by mass of the epoxy resin curing agent C, and 100 parts by mass of an epoxy resin having a glycidyloxy group derived from bisphenol A (jER1001X75, manufactured by Mitsubishi Chemical Corporation, solid concentration: 75% by mass), and as a solvent, 57.9 parts by mass of 1-butanol were prepared and well stirred to give an epoxy resin composition (number of active amine hydrogens in epoxy resin curing agent/number of epoxy groups in epoxy resin=1.2). The solvent content in the resultant epoxy resin composition is shown in Table 2.

Next, using an applicator, the resin composition was applied onto a substrate, zinc phosphate-processed iron plate (SPCC-SD PB-N144, manufactured by Paltek Corporation, 0.8×70×150 mm) at 23° C. (thickness of the coating film: 200 μm (immediately after coating)), and cured (curing temperature: 23° C., curing time: 4.0 hours). Immediately after the curing step, the solvent content was measured according to the above-described method. The result is shown in Table 3. Further, after the curing step, the solvent amount was controlled under the condition of 23° C./2 days to give a coating film.

The formed coating film was tested according to the above-described methods to evaluate the appearance, the salt spray resistance, the hydrous methanol resistance, the sulfuric acid resistance and the solvent content thereof. The results are shown in Table 4.

Example 7

65.7 parts by mass of the epoxy resin curing agent C, and 100 parts by mass of an epoxy resin having a glycidyloxy group derived from bisphenol A (jER1001X75, manufactured by Mitsubishi Chemical Corporation, solid concentration: 75% by mass), and as a solvent, 57.9 parts by mass of 1-butanol were prepared and well stirred to give an epoxy resin composition (number of active amine hydrogens in epoxy resin curing agent/number of epoxy groups in epoxy resin=1.2). The solvent content in the resultant epoxy resin composition is shown in Table 2.

Next, using an applicator, the resin composition was applied onto a substrate, zinc phosphate-processed iron plate (SPCC-SD PB-N144, manufactured by Paltek Corporation, 0.8×70×150 mm) at 23° C. (thickness of the coating film: 200 μm (immediately after coating)), and cured (curing temperature: 23° C., curing time: 4.0 hours). Immediately after the curing step, the solvent content was measured according to the above-described method. The result is shown in Table 3. In forming a coating film herein, the step of controlling the solvent amount in the coating film was omitted.

The formed coating film was tested according to the above-described methods to evaluate the appearance, the salt spray resistance, the hydrous methanol resistance, the sulfuric acid resistance and the solvent content thereof. The results are shown in Table 4.

Example 8

65.7 parts by mass of the epoxy resin curing agent C, and 100 parts by mass of an epoxy resin having a glycidyloxy group derived from bisphenol A (jER1001X75, manufactured by Mitsubishi Chemical Corporation, solid concentration: 75% by mass), and as a solvent, 57.9 parts by mass of 1-butanol were prepared and well stirred to give an epoxy resin composition (number of active amine hydrogens in epoxy resin curing agent/number of epoxy groups in epoxy resin=1.2). The solvent content in the resultant epoxy resin composition is shown in Table 2.

Next, using an applicator, the resin composition was applied onto a substrate, zinc phosphate-processed iron plate (SPCC-SD PB-N144, manufactured by Paltek Corporation, 0.8×70×150 mm) at 23° C. (thickness of the coating film: 200 μm (immediately after coating)), and cured (curing temperature: 23° C., curing time: 4.0 hours). Immediately after the curing step, the solvent content was measured according to the above-described method. The result is shown in Table 3. Further, after the curing step, the solvent amount was controlled under the condition of 5° C./7 days to give a coating film.

The formed coating film was tested according to the above-described methods to evaluate the appearance, the salt spray resistance, the hydrous methanol resistance, the sulfuric acid resistance and the solvent content thereof. The results are shown in Table 4.

Example 9

65.7 parts by mass of the epoxy resin curing agent C, and 100 parts by mass of an epoxy resin having a glycidyloxy group derived from bisphenol A (jER1001X75, manufactured by Mitsubishi Chemical Corporation, solid concentration: 75% by mass), and as a solvent, 57.9 parts by mass of 1-butanol were prepared and well stirred to give an epoxy resin composition (number of active amine hydrogens in epoxy resin curing agent/number of epoxy groups in epoxy resin=1.2). The solvent content in the resultant epoxy resin composition is shown in Table 2.

Next, using an applicator, the resin composition was applied onto a substrate, zinc phosphate-processed iron plate (SPCC-SD PB-N144, manufactured by Paltek Corporation, 0.8×70×150 mm) at 5° C. (thickness of the coating film: 200 μm (immediately after coating)), and cured (curing temperature: 5° C., curing time: 36.0 hours). Immediately after the curing step, the solvent content was measured according to the above-described method. The result is shown in Table 3. Further, after the curing step, the solvent amount was controlled under the condition of 23° C./7 days to give a coating film.

The formed coating film was tested according to the above-described methods to evaluate the appearance, the salt spray resistance, the hydrous methanol resistance, the sulfuric acid resistance and the solvent content thereof. The results are shown in Table 4.

Example 10

65.7 parts by mass of the epoxy resin curing agent C, and 100 parts by mass of an epoxy resin having a glycidyloxy group derived from bisphenol A (jER1001X75, manufactured by Mitsubishi Chemical Corporation, solid concentration: 75% by mass), and as a solvent, 57.9 parts by mass of 1-butanol were prepared and well stirred to give an epoxy resin composition (number of active amine hydrogens in epoxy resin curing agent/number of epoxy groups in epoxy resin=1.2). The solvent content in the resultant epoxy resin composition is shown in Table 2.

Next, using an applicator, the resin composition was applied onto a substrate, zinc phosphate-processed iron plate (SPCC-SD PB-N144, manufactured by Paltek Corporation, 0.8×70×150 mm) at 5° C. (thickness of the coating film: 200 μm (immediately after coating)), and cured (curing temperature: 5° C., curing time: 36.0 hours). Immediately after the curing step, the solvent content was measured according to the above-described method. The result is shown in Table 3. Further, after the curing step, the solvent amount was controlled under the condition of 5° C./7 days to give a coating film.

The formed coating film was tested according to the above-described methods to evaluate the appearance, the salt spray resistance, the hydrous methanol resistance, the sulfuric acid resistance and the solvent content thereof. The results are shown in Table 4.

Example 11

65.7 parts by mass of the epoxy resin curing agent C, and 100 parts by mass of an epoxy resin having a glycidyloxy group derived from bisphenol A (jER1001X75, manufactured by Mitsubishi Chemical Corporation, solid concentration: 75% by mass), and as a solvent, 57.9 parts by mass of 1-butanol were prepared and well stirred to give an epoxy resin composition (number of active amine hydrogens in epoxy resin curing agent/number of epoxy groups in epoxy resin=1.2). The solvent content in the resultant epoxy resin composition is shown in Table 2.

Next, using an applicator, the resin composition was applied onto a substrate, zinc phosphate-processed iron plate (SPCC-SD PB-N144, manufactured by Paltek Corporation, 0.8×70×150 mm) at 40° C. (thickness of the coating film: 200 μm (immediately after coating)), and cured (curing temperature: 40° C., curing time: 1.5 hours). Immediately after the curing step, the solvent content was measured according to the above-described method. The result is shown in Table 3. In forming a coating film herein, the step of controlling the solvent amount in the coating film was omitted.

The formed coating film was tested according to the above-described methods to evaluate the appearance, the salt spray resistance, the hydrous methanol resistance, the sulfuric acid resistance and the solvent content thereof. The results are shown in Table 4.

Example 12

70.7 parts by mass of the epoxy resin curing agent D, and 100 parts by mass of an epoxy resin having a glycidyloxy group derived from bisphenol A (jER1001X75, manufactured by Mitsubishi Chemical Corporation, solid concentration: 75% by mass), and as a solvent, 60.4 parts by mass of 1-butanol were prepared and well stirred to give an epoxy resin composition (number of active amine hydrogens in epoxy resin curing agent/number of epoxy groups in epoxy resin=1.2). The solvent content in the resultant epoxy resin composition is shown in Table 2.

Next, using an applicator, the resin composition was applied onto a substrate, zinc phosphate-processed iron plate (SPCC-SD PB-N144, manufactured by Paltek Corporation, 0.8×70×150 mm) at 23° C. (thickness of the coating film: 200 μm (immediately after coating)), and cured (curing temperature: 23° C., curing time: 8.0 hours). Immediately after the curing step, the solvent content was measured according to the above-described method. The result is shown in Table 3. Further, after the curing step, the solvent amount was controlled under the condition of 23° C./7 days to give a coating film.

The formed coating film was tested according to the above-described methods to evaluate the appearance, the salt spray resistance, the hydrous methanol resistance, the sulfuric acid resistance and the solvent content thereof. The results are shown in Table 4.

Example 13

92.8 parts by mass of the epoxy resin curing agent E, and 100 parts by mass of an epoxy resin having a glycidyloxy group derived from bisphenol A (jER1001X75, manufactured by Mitsubishi Chemical Corporation, solid concentration: 75% by mass), and as a solvent, 71.4 parts by mass of 1-butanol were prepared and well stirred to give an epoxy resin composition (number of active amine hydrogens in epoxy resin curing agent/number of epoxy groups in epoxy resin=1.2). The solvent content in the resultant epoxy resin composition is shown in Table 2.

Next, using an applicator, the resin composition was applied onto a substrate, zinc phosphate-processed iron plate (SPCC-SD PB-N144, manufactured by Paltek Corporation, 0.8×70×150 mm) at 23° C. (thickness of the coating film: 200 μm (immediately after coating)), and cured (curing temperature: 23° C., curing time: 8.5 hours). Immediately after the curing step, the solvent content was measured according to the above-described method. The result is shown in Table 3. Further, after the curing step, the solvent amount was controlled under the condition of 23° C./7 days to give a coating film.

The formed coating film was tested according to the above-described methods to evaluate the appearance, the salt spray resistance, the hydrous methanol resistance, the sulfuric acid resistance and the solvent content thereof. The results are shown in Table 4.

Comparative Example 1

222 parts by mass of the epoxy resin curing agent A, and 100 parts by mass of an epoxy resin having a glycidyloxy group derived from bisphenol A (jER828, manufactured by Mitsubishi Chemical Corporation, solid concentration: 100% by mass), and as a solvent, 111 parts by mass of 1-butanol were prepared and well stirred to give an epoxy resin composition (number of active amine hydrogens in epoxy resin curing agent/number of epoxy groups in epoxy resin=1.2). The solvent content in the resultant epoxy resin composition is shown in Table 2.

Next, using an applicator, the resin composition was applied onto a substrate, zinc phosphate-processed iron plate (SPCC-SD PB-N144, manufactured by Paltek Corporation, 0.8×70×150 mm) at 23° C. (thickness of the coating film: 200 μm (immediately after coating)), and cured (curing temperature: 23° C., curing time: 3.5 hours). Immediately after the curing step, the solvent content was measured according to the above-described method. The result is shown in Table 3. Further, after the curing step, this was dried under the condition of 100° C./15 minutes to give a coating film.

The formed coating film was tested according to the above-described methods to evaluate the appearance, the salt spray resistance, the hydrous methanol resistance, the sulfuric acid resistance and the solvent content thereof. The results are shown in Table 4.

Comparative Example 2

65.7 parts by mass of the epoxy resin curing agent A, and 100 parts by mass of an epoxy resin having a glycidyloxy group derived from bisphenol A (jER1001X75, manufactured by Mitsubishi Chemical Corporation, solid concentration: 75% by mass), and as a solvent, 57.9 parts by mass of 1-butanol were prepared and well stirred to give an epoxy resin composition (number of active amine hydrogens in epoxy resin curing agent/number of epoxy groups in epoxy resin=1.2). The solvent content in the resultant epoxy resin composition is shown in Table 2.

Next, using an applicator, the resin composition was applied onto a substrate, zinc phosphate-processed iron plate (SPCC-SD PB-N144, manufactured by Paltek Corporation, 0.8×70×150 mm) at 23° C. (thickness of the coating film: 200 μm (immediately after coating)), and cured (curing temperature: 23° C., curing time: 4.0 hours). Immediately after the curing step, the solvent content was measured according to the above-described method. The result is shown in Table 3. Further, after the curing step, this was dried under the condition of 100° C./15 minutes to give a coating film.

The formed coating film was tested according to the above-described methods to evaluate the appearance, the salt spray resistance, the hydrous methanol resistance, the sulfuric acid resistance and the solvent content thereof. The results are shown in Table 4.

Comparative Example 3

As an epoxy resin curing agent, 103 parts by mass of a general-purpose polyamide-modified polyamine modified with a dimer acid (Tohmide 225X manufactured by Fuji Kasei Co., Ltd., solid concentration: 100% by mass), and 100 parts by mass of an epoxy resin having a glycidyloxy group derived from bisphenol A (jER828, manufactured by Mitsubishi Chemical Corporation, solid concentration: 100% by mass), and as a solvent, 203 parts by mass of 1-butanol were prepared and well stirred to give an epoxy resin composition (number of active amine hydrogens in epoxy resin curing agent/number of epoxy groups in epoxy resin=1.0).

Next, using an applicator, the resin composition was applied onto a substrate, zinc phosphate-processed iron plate (SPCC-SD PB-N144, manufactured by Paltek Corporation, 0.8×70×150 mm) at 23° C. (thickness of the coating film: 200 μm (immediately after coating)), and cured (curing temperature: 23° C., curing time: 16.0 hours). Immediately after the curing step, the solvent content was measured according to the above-described method. The result is shown in Table 3. Further, after the curing step, the solvent amount was controlled under the condition of 23° C./7 days to give a coating film.

The formed coating film was tested according to the above-described methods to evaluate the appearance, the salt spray resistance, the hydrous methanol resistance, the sulfuric acid resistance and the solvent content thereof. The results are shown in Table 4.

TABLE 2

| | Epoxy Resin Curing Agent | | Epoxy Resin | | Added | Solid Concentration | Solvent Content in Epoxy Resin Composition (mass %) | | | | |
|---|---|---|---|---|---|---|---|---|---|---|---|
| | Code | Solvent | Kind | Solvent | Solvent | mass % | ethanol | 1-butanol | toluene | xylene | total |
| Example 1 | A | ethanol | jER828 | | 1-butanol | 50 | 26.3 | 23.7 | | | 50 |
| Example 2 | A | ethanol | jER1001X75 | xylene | 1-butanol | 50 | 15.2 | 23.2 | | 11.6 | 50 |
| Example 3 | A | ethanol | TETRAD-X | | 1-butanol | 50 | 33.8 | 16.2 | | | 50 |
| Example 4 | B | 1-butanol | jER1001X75 | xylene | 1-butanol | 50 | | 38.4 | | 11.6 | 50 |
| Example 5 | C | 1-butanol/ toluene | jER1001X75 | xylene | 1-butanol | 50 | | 31.6 | 6.9 | 11.6 | 50 |
| Example 6 | C | 1-butanol/ toluene | jER1001X75 | xylene | 1-butanol | 50 | | 31.6 | 6.9 | 11.6 | 50 |
| Example 7 | C | 1-butanol/ toluene | jER1001X75 | xylene | 1-butanol | 50 | | 31.6 | 6.9 | 11.6 | 50 |
| Example 8 | C | 1-butanol/ toluene | jER1001X75 | xylene | 1-butanol | 50 | | 31.6 | 6.9 | 11.6 | 50 |

TABLE 2-continued

|  | Epoxy Resin Curing Agent | | Epoxy Resin | | Added Solvent | Solid Concentration mass % | Solvent Content in Epoxy Resin Composition (mass %) | | | | |
| --- | --- | --- | --- | --- | --- | --- | --- | --- | --- | --- | --- |
|  | Code | Solvent | Kind | Solvent |  |  | ethanol | 1-butanol | toluene | xylene | total |
| Example 9 | C | 1-butanol/toluene | jER1001X75 | xylene | 1-butanol | 50 |  | 31.6 | 6.9 | 11.6 | 50 |
| Example 10 | C | 1-butanol/toluene | jER1001X75 | xylene | 1-butanol | 50 |  | 31.6 | 6.9 | 11.6 | 50 |
| Example 11 | C | 1-butanol/toluene | jER1001X75 | xylene | 1-butanol | 50 |  | 31.6 | 6.9 | 11.6 | 50 |
| Example 12 | D | 1-butanol | jER1001X75 | xylene | 1-butanol | 50 |  | 38.7 |  | 11.3 | 50 |
| Example 13 | E | 1-butanol | jER1001X75 | xylene | 1-butanol | 50 |  | 39.7 |  | 10.3 | 50 |
| Comparative Example 1 | A | ethanol | jER828 |  | 1-butanol | 50 | 26.3 | 23.7 |  |  | 50 |
| Comparative Example 2 | A | ethanol | jER1001X75 | xylene | 1-butanol | 50 | 15.2 | 23.2 |  | 11.6 | 50 |
| Comparative Example 3 | Tohmide 225X |  | jER828 |  | 1-butanol | 50 |  | 50.0 |  |  | 50 |

TABLE 3

|  | Solvent Content in Coating Film (g/m$^2$) | | | | | Solvent Content in Coating Film (mass %) | | | | |
| --- | --- | --- | --- | --- | --- | --- | --- | --- | --- | --- |
|  | ethanol | 1-butanol | toluene | xylene | total | ethanol | 1-butanol | toluene | xylene | total |
| Example 1 | 21.0 | 18.0 |  |  | 39.0 | 10.5 | 9.0 | 0.0 | 0.0 | 19.5 |
| Example 2 | 15.0 | 17.0 |  | 14.0 | 46.0 | 7.5 | 8.5 | 0.0 | 7.0 | 23.0 |
| Example 3 | 30.0 | 10.0 |  |  | 40.0 | 15.0 | 5.0 | 0.0 | 0.0 | 20.0 |
| Example 4 |  | 28.0 |  | 15.0 | 43.0 | 0.0 | 14.0 | 0.0 | 7.5 | 21.5 |
| Example 5 |  | 25.0 | 4.0 | 9.0 | 38.0 | 0.0 | 12.5 | 2.0 | 4.5 | 19.0 |
| Example 6 |  | 25.0 | 4.0 | 9.0 | 38.0 | 0.0 | 12.5 | 2.0 | 4.5 | 19.0 |
| Example 7 |  | 25.0 | 4.0 | 9.0 | 38.0 | 0.0 | 12.5 | 2.0 | 4.5 | 19.0 |
| Example 8 |  | 25.0 | 4.0 | 9.0 | 38.0 | 0.0 | 12.5 | 2.0 | 4.5 | 19.0 |
| Example 9 |  | 35.0 | 8.0 | 13.0 | 56.0 | 0.0 | 17.5 | 4.0 | 6.5 | 28.0 |
| Example 10 |  | 35.0 | 8.0 | 13.0 | 56.0 | 0.0 | 17.5 | 4.0 | 6.5 | 28.0 |
| Example 11 |  | 6.0 | 0.5 | 1.0 | 7.5 | 0.0 | 3.0 | 0.3 | 0.5 | 3.8 |
| Example 12 |  | 29.0 |  | 14.0 | 43.0 | 0.0 | 14.5 | 0.0 | 7.0 | 21.5 |
| Example 13 |  | 27.5 |  | 9.5 | 37.0 | 0.0 | 13.8 | 0.0 | 4.8 | 18.6 |
| Comparative Example 1 | 21.0 | 18.0 |  |  | 39.0 | 10.5 | 9.0 | 0.0 | 0.0 | 19.5 |
| Comparative Example 2 | 21.0 | 18.0 |  |  | 39.0 | 10.5 | 9.0 | 0.0 | 0.0 | 19.5 |
| Comparative Example 3 |  | 31.0 |  |  | 31.0 | 0.0 | 15.5 | 0.0 | 0.0 | 15.5 |

TABLE 4

|  | Solvent Content in Coating Film (g/m$^2$) | | | | | Solvent Content in Coating Film (mass %) | | | | | Appearance | | | |
| --- | --- | --- | --- | --- | --- | --- | --- | --- | --- | --- | --- | --- | --- | --- |
|  | ethanol | 1-butanol | toluene | xylene | total | ethanol | 1-butanol | toluene | xylene | Total | After solvent amount controlling step | After salt spray | After impregnation in MeOH | After impregnation in 10% sulfuric acid |
| Example 1 | 6.0 | 10.0 |  |  | 16.0 | 3.0 | 5.0 | 0.0 | 0.0 | 8.0 | A | A | A | B |
| Example 2 | 4.0 | 9.0 |  | 3.0 | 16.0 | 2.0 | 4.5 | 0.0 | 1.5 | 8.0 | A | A | A | A |
| Example 3 | 6.5 | 7.0 |  |  | 13.5 | 3.3 | 3.5 | 0.0 | 0.0 | 6.8 | A | A | A | A |
| Example 4 |  | 11.0 |  | 2.5 | 13.5 | 0.0 | 5.5 | 0.0 | 1.3 | 6.8 | A | A | A | A |
| Example 5 |  | 10.5 | 1.5 | 1.5 | 13.5 | 0.0 | 5.3 | 0.8 | 0.8 | 6.9 | A | A | A | A |
| Example 6 |  | 11.5 | 1.5 | 2.0 | 15.0 | 0.0 | 5.8 | 0.8 | 1.0 | 7.6 | A | A | A | A |
| Example 7 |  | 25.0 | 4.0 | 9.0 | 38.0 | 0.0 | 12.5 | 2.0 | 4.5 | 19.0 | A | A | A | A |
| Example 8 |  | 16.5 | 2.0 | 2.0 | 20.5 | 0.0 | 8.3 | 1.0 | 1.0 | 10.3 | A | A | A | A |
| Example 9 |  | 18.0 | 2.0 | 3.0 | 23.0 | 0.0 | 9.0 | 1.0 | 1.5 | 11.5 | A | A | A | A |
| Example 10 |  | 19.0 | 3.0 | 4.0 | 26.0 | 0.0 | 9.6 | 1.5 | 2.0 | 13.1 | A | A | A | A |
| Example 11 |  | 6.0 | 0.5 | 1.0 | 7.5 | 0.0 | 3.0 | 0.3 | 0.5 | 3.8 | A | A | A | A |
| Example 12 |  | 9.5 |  | 2.5 | 12.0 | 0.0 | 4.8 | 0.0 | 1.3 | 6.1 | A | A | A | B |
| Example 13 |  | 10.5 |  | 2.0 | 12.5 | 0.0 | 5.3 | 0.0 | 1.0 | 6.3 | A | A | A | B |
| Comparative Example 1 | 0.2 | 0.5 |  |  | 0.7 | 0.1 | 0.3 | 0.0 | 0.0 | 0.4 | B | B | C | C |

TABLE 4-continued

| | Solvent Content in Coating Film (g/m²) | | | | | Solvent Content in Coating Film (mass %) | | | | | Appearance | | | |
|---|---|---|---|---|---|---|---|---|---|---|---|---|---|---|
| | | | | | | | | | | | After solvent amount controlling step | After salt spray | After impregnation in MeOH | After impregnation in 10% sulfuric acid |
| | ethanol | 1-butanol | toluene | xylene | total | ethanol | 1-butanol | toluene | xylene | Total | | | | |
| Comparative Example 2 | 0.1 | 0.4 | | 0.2 | 0.7 | 0.1 | 0.2 | 0.0 | 0.1 | 0.4 | A | C | C | C |
| Comparative Example 3 | | 8.0 | | | 8.0 | 0.0 | 4.0 | 0.0 | 0.0 | 4.0 | A | C | A | D |

In Examples 1 to 13, the curing step and the subsequent solvent amount controlling step were carried out under adequate conditions so as to control the solvent content in the coating film to fall within a defined range, and therefore in these, coating films having high salt spray resistance, hydrous methanol resistance and sulfuric acid resistance could be obtained.

On the other hand, in Comparative Examples 1 and 2, the solvent in the coating film was evaporated away to less than the lower limit (1% by mass) of the defined range by drying at 100° C. after the curing step, and as a result, in these, the salt spray resistance, the hydrous methanol resistance and the sulfuric acid resistance lowered.

Further, in the case of not using the epoxy curing agent for use in this embodiment as in Comparative Example 3, the coating film could not express salt spray resistance, hydrous methanol resistance and sulfuric acid resistance even though the solvent content therein could fall within the defined range.

INDUSTRIAL APPLICABILITY

The coating film of the present invention can express both good appearance and excellent chemical resistance, and is therefore favorably used for paint applications such as a coating material for ships, a heavy-duty coating material, a coating material for tanks, a coating material for inner surfaces of pipes, an exterior coating material, a coating material for floors, etc.

The invention claimed is:

1. A cured coating film formed by curing an epoxy resin composition comprising an epoxy resin, an epoxy resin curing agent, and a solvent, wherein the cured coating film comprises the solvent in a ratio of 1% by mass or more and 20% by mass or less, and the epoxy resin curing agent is a reaction product of the following (A) and (B):
   (A) at least one selected from the group consisting of metaxylylenediamine and paraxylylenediamine, and
   (B) at least one selected from the group consisting of an unsaturated carboxylic acid represented by the following formula (1) and a derivative thereof:

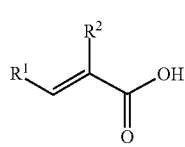

(1)

wherein $R^1$ and $R^2$ each independently represent a hydrogen atom, an alkyl group having 1 to 8 carbon atoms, an aralkyl group having 1 to 8 carbon atoms, or an aryl group,
wherein the solvent is a combination of an alcohol compound and a hydrocarbon compound having an aromatic ring; and
wherein the evaporation rate of the solvent is 0.10 or more and 4.5 or less when the evaporation rate of butyl acetate is taken as 1 being a standard value,
wherein the cured coating film is obtained by a method comprising:
   applying the epoxy resin composition to form a coating film of the epoxy resin composition, and then curing the coating film,
wherein the applying and the curing steps are carried out at a temperature of 50° C. or lower.

2. The cured coating film according to claim 1, wherein the alcohol compound is at least one selected from the group consisting of methanol, ethanol, 2-propanol, 1-propanol, 2-methyl-1-propanol, 1-butanol, and 2-butanol.

3. The cured coating film according to claim 1, wherein the hydrocarbon compound having an aromatic ring is at least one selected from the group consisting of toluene, p-xylene, m-xylene, o-xylene, styrene, and ethylbenzene.

4. The cured coating film according to claim 1, wherein the component (A) is metaxylylenediamine.

5. The cured coating film according to claim 1, wherein the component (B) is at least one selected from the group consisting of acrylic acid, methacrylic acid, crotonic acid, and derivatives thereof.

6. The cured coating film according to claim 1, wherein the derivative as the component (B) is at least one selected from the group consisting of an ester, an amide, an acid anhydride, and an acid chloride.

7. The cured coating film according to claim 1, wherein the epoxy resin is at least one selected from the group consisting of an epoxy resin having a glycidylamino group derived from metaxylylenediamine, an epoxy resin having a glycidylamino group derived from 1,3-bis(aminomethyl)cyclohexane, an epoxy resin having a glycidylamino group derived from diaminodiphenylmethane, an epoxy resin having a glycidylamino group derived from para-aminophenol, an epoxy resin having a glycidyloxy group derived from para-aminophenol, an epoxy resin having a glycidyloxy group derived from bisphenol A, an epoxy resin having a glycidyloxy group derived from bisphenol F, an epoxy resin having a glycidyloxy group derived from phenol-novolak, and an epoxy resin having a glycidyloxy group derived from resorcinol.

8. The cured coating film according to claim 7, wherein the epoxy resin is at least one selected from the group consisting of an epoxy resin having a glycidylamino group derived from metaxylylenediamine, an epoxy resin having a glycidyloxy group derived from bisphenol A, and an epoxy resin having a glycidyloxy group derived from bisphenol F.

9. The cured coating film according to claim 8, wherein the epoxy resin is an epoxy resin having a glycidyloxy group derived from bisphenol A.

10. The cured coating film according to claim 1, wherein the epoxy resin composition is for a coating material for ships, a heavy-duty coating material, a coating material for tanks, a coating material for inner surfaces of pipes, an exterior coating material, or a coating material for floors.

11. A method for producing the cured coating film of claim 1, wherein the curing time is from 0.5 to 48 hours.

12. The method for producing the coating film according to claim 11, further comprising controlling the solvent amount after the curing.

13. A method for improving chemical resistance of a coating film, wherein the coating film is formed by curing an epoxy resin composition comprising an epoxy resin, an epoxy resin curing agent, and a solvent, the epoxy resin curing agent is a reaction product of the following (A) and (B), and the coating film after curing comprises the solvent in a ratio of 1% by mass or more and 20% by mass or less:
(A) at least one selected from the group consisting of metaxylylenediamine and paraxylylenediamine,
(B) at least one selected from the group consisting of an unsaturated carboxylic acid represented by the following formula (1) and a derivative thereof:

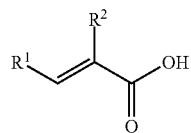

wherein $R^1$ and $R^2$ each independently represent a hydrogen atom, an alkyl group having 1 to 8 carbon atoms, an aralkyl group having 1 to 8 carbon atoms, or an aryl group,
wherein the solvent is a combination of an alcohol compound and a hydrocarbon compound having an aromatic ring; and
wherein the evaporation rate of the solvent is 0.10 or more and 4.5 or less when the evaporation rate of butyl acetate is taken as 1 being a standard value,
wherein the curing step is carried out at a temperature of 50° C. or lower.

14. The cured coating film according to claim 1, wherein a content of the solvent in the coating film is from 3.0% by mass to 20% by mass.

15. The cured coating film according to claim 1, wherein a ratio of the alcohol compound and the hydrocarbon compound having the aromatic ring is within a range of 90/10 to 40/60 by mass.

16. The method for producing the coating film according to claim 12, wherein the temperature in the controlling the solvent amount is from 5° C. to 30° C.

17. A method for producing the cured coating film according to claim 1, wherein the method comprises:
applying an epoxy resin composition comprising at least an epoxy resin, an epoxy resin curing agent, and a solvent to form the coating film of the epoxy resin composition,
curing the coating film, and
controlling the solvent amount after the curing,
wherein the epoxy resin curing agent is a reaction product of the following (A) and (B):
(A) at least one selected from the group consisting of metaxylylenediamine and paraxylylenediamine; and
(B) at least one selected from the group consisting of an unsaturated carboxylic acid represented by the following formula (1) and a derivative thereof:

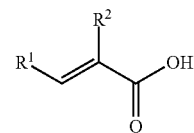

wherein $R^1$ and $R^2$ each independently represents a hydrogen atom, an alkyl group having 1 to 8 carbon atoms, an aralkyl group having 1 to 8 carbon atoms, or an aryl group, and
wherein the applying, the curing, and the controlling are carried out at a temperature of 50° C. or lower,
wherein the solvent is a combination of an alcohol compound and a hydrocarbon compound having an aromatic ring; and
wherein the evaporation rate of the solvent is 0.10 or more and 4.5 or less when the evaporation rate of butyl acetate is taken as 1 being a standard value.

* * * * *